(12) United States Patent
Lee et al.

(10) Patent No.: US 9,733,778 B2
(45) Date of Patent: Aug. 15, 2017

(54) TOUCH SENSING APPARATUS

(71) Applicant: LG Display Co., Ltd., Seoul (KR)

(72) Inventors: Sangyong Lee, Seoul (KR); Kyungjin Jang, Seoul (KR); Jaekyu Park, Gimpo-si (KR); Youngwoo Jo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 83 days.

(21) Appl. No.: 14/983,328

(22) Filed: Dec. 29, 2015

(65) Prior Publication Data

US 2017/0003780 A1 Jan. 5, 2017

(30) Foreign Application Priority Data

Jun. 30, 2015 (KR) ........................ 10-2015-0093289

(51) Int. Cl.
| | |
|---|---|
| *H01L 27/24* | (2006.01) |
| *G06F 3/044* | (2006.01) |
| *G06F 3/041* | (2006.01) |
| *G09G 3/20* | (2006.01) |

(52) U.S. Cl.
CPC ............ *G06F 3/044* (2013.01); *G06F 3/0412* (2013.01); *G06F 3/0416* (2013.01); *G09G 3/20* (2013.01)

(58) Field of Classification Search
CPC ...... G06F 3/044; G06F 3/0412; G06F 3/0416; G06F 2203/04111
See application file for complete search history.

(56) References Cited

U.S. PATENT DOCUMENTS

| | | | |
|---|---|---|---|
| 2011/0061947 A1* | 3/2011 | Krah ...................... | G06F 1/3215 178/18.01 |
| 2016/0284732 A1* | 9/2016 | Wei ....................... | H01L 27/124 |

* cited by examiner

*Primary Examiner* — Michael Faragalla
(74) *Attorney, Agent, or Firm* — Fenwick & West LLP

(57) ABSTRACT

A touch sensing circuit is configured to supply touch drive signals to electrodes of a touch sensitive display device and detect corresponding touch sense signals from the electrodes in response to the supplied touch drive signals, a touch sense signal indicating a change in self-capacitance of a driven electrode in response to a touch input on the driven electrode. The touch sensing circuit is further configured to integrate, for a first predetermined duration of time, a measure of each of the touch sense signals, to generate a first integrated signal corresponding to each touch sense signal; integrate, for a second predetermined duration of time, the first integrated signal, to generate a second integrated signal corresponding to each touch sense signal; and determine presence of one or more touch inputs on one or more of the electrodes based on the second integrated signal.

18 Claims, 5 Drawing Sheets

TOUCH SENSING APPARATUS

RELATED APPLICATIONS

This application claims the benefit of Korea Patent Application No. 10-2015-0093289 filed on Jun. 30, 2015, the entire contents of which are incorporated herein by reference for all purposes as if fully set forth herein.

BACKGROUND

Technical Field

The present disclosure relates to a touch sensing apparatus.

Discussion of the Related Art

User interfaces (UIs), enabling communication between human beings (users) and various electric or electronic devices, allow users to easily control devices as they like. Typical examples of such user interfaces include keypads, keyboards, mouse, on-screen displays (OSDs), and remote controllers having an infrared or radio frequency (RF) communication function. User interface techniques have steadily advanced toward enhancing user emotions and operation convenience. Recently, user interfaces have evolved into touch UIs, voice recognition UIs, and 3D UIs, and thereamong, the touch UIs tend to be predominantly installed in portable information devices. Applications of touch UIs include a touch sensing apparatuses installed in display devices of home appliances or in portable information devices.

A capacitive touch sensing apparatus has high durability and spatial precision and enables multi-touch recognition and proximity touch recognition. Capacitive touch sensors can be used in various applications, more so than existing resistive touch sensing schemes. In the capacitive touch sensing apparatus, a touch sensor maybe bonded to a display device or maybe installed in a display panel of the display device, and thus, the touch sensor is electrically coupled with the display pixels of the display device.

The touch sensing apparatus determines whether a touch has been applied to the touch sensor upon sensing a change in capacitance of the touch sensor; but in some cases, an amount of a change in capacitance of the touch sensor due to an external touch is so small that it is not easy to determine whether a touch has been applied.

In order to more accurately determine whether a touch has been applied, a longer touch driving period is needed. However, the touch panel coupled to the display panel is driven with the display panel in a time-division multiplexed manner within one frame period, making it difficult to secure a sufficiently long touch screen driving period.

SUMMARY

According to one or more embodiments, a touch sensitive display device comprises a display panel comprising a plurality of display pixels defined at intersections of gate lines and data lines; a plurality of electrodes; and a touch sensing circuit. The touch sensing circuit is configured to supply touch drive signals to the electrodes and detect corresponding touch sense signals from the electrodes in response to the supplied touch drive signals, a touch sense signal indicating a change in self-capacitance of a driven electrode in response to a touch input on the driven electrode. The touch sensing circuit is further configured to integrate, for a first predetermined duration of time, a measure of each of the touch sense signals, to generate a first integrated signal corresponding to each touch sense signal; integrate, for a second predetermined duration of time, the first integrated signal, to generate a second integrated signal corresponding to each touch sense signal; and determine presence of one or more touch inputs on one or more of the electrodes based on the second integrated signal.

In one or more embodiments, the touch sensitive display device is an in-cell touch sensitive display device where each of the electrodes operates as a common electrode for one or more of the display pixels during display driving mode, and operates as a touch electrode during touch driving mode.

In one or more embodiments, the touch sensing circuit is configured to determine presence of touch inputs on the electrodes based on the second integrated signal by comparing the second integrated signal with a predefined threshold value, and determining a presence of a touch input on a respective electrode if the corresponding second integrated signal for the respective electrode exceeds the predefined threshold value.

In one or more embodiments, the touch sensing circuit comprises an integrator circuit including a plurality of integrators connected in series. The plurality of integrators includes a first integrator to sample and accumulate the measure of the touch sense signal, based on a first control signal and a second control signal, respectively, to generate the first integrated signal; and a second integrator to sample and accumulate the first integrated signal, based on the first control signal and the second control signal, respectively, to generate the second integrated signal.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the invention. In the drawings.

DETAILED DESCRIPTION OF THE EMBODIMENTS

Hereinafter, embodiments of the present embodiments will be described in detail with reference to the accompanying drawings. Like reference numerals refer to like elements throughout.

A display device according to an embodiment of the present disclosure may be implemented on the basis of a flat panel display device such as a liquid crystal display (LCD), a field emission display (FED), a plasma display panel (PDP), an organic light emitting display (OLED), or an electrophoresist (EPD) display. Hereinafter, a liquid crystal display (LCD) device will be described as an example of a flat panel display device, but the display device of the present invention is not limited thereto.

Figure 1:
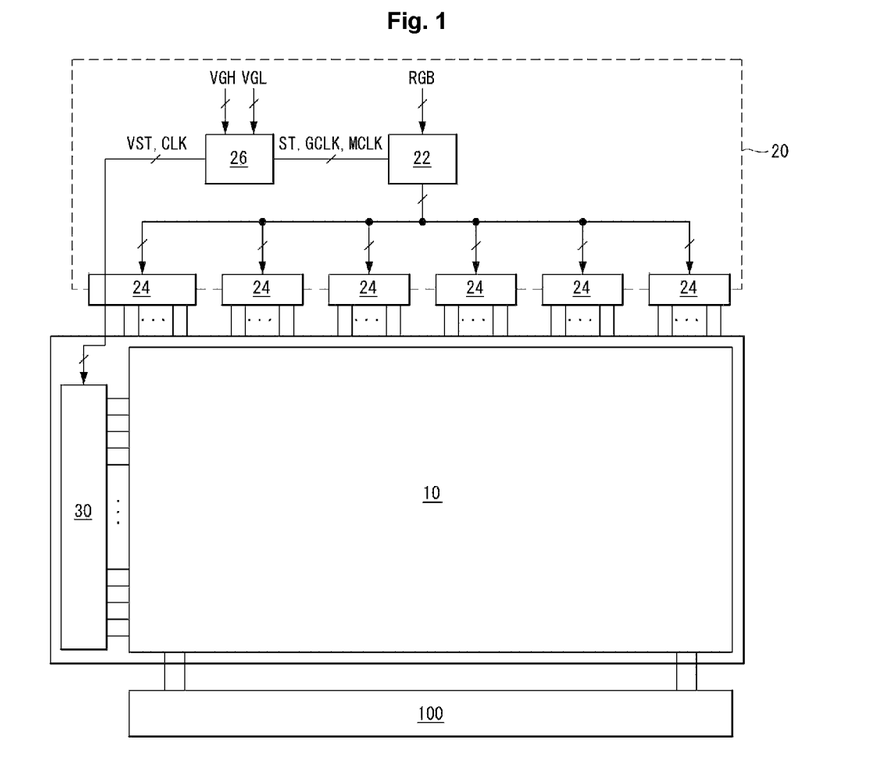
FIG. 1 is a block diagram illustrating a display device according to an embodiment.

FIG. 1 is a block diagram illustrating a display device including a touch panel according to a first embodiment of the present disclosure.

Referring to FIG. 1, the display device according to the first embodiment of the present invention includes a display panel driving circuit, a timing controller 22, and a touch sensing circuit 100.

The display panel 10 includes two substrates and a liquid crystal layer formed between the two substrates. The substrates may be formed as glass substrates, plastic substrates, or film substrates. A pixel array formed on a lower substrate of the display panel 10 includes data lines DL, gate lines GL intersecting the data lines DL, and pixels disposed in a matrix form. The pixel array further includes a plurality of thin film transistors (TFTs) formed in the intersections of the data lines DL and the gate lines GL, pixel electrodes 1 for charging a data voltage in the pixels, and storage capacitors Cst connected to the pixel electrodes to maintain a pixel voltage.

Figure 2:
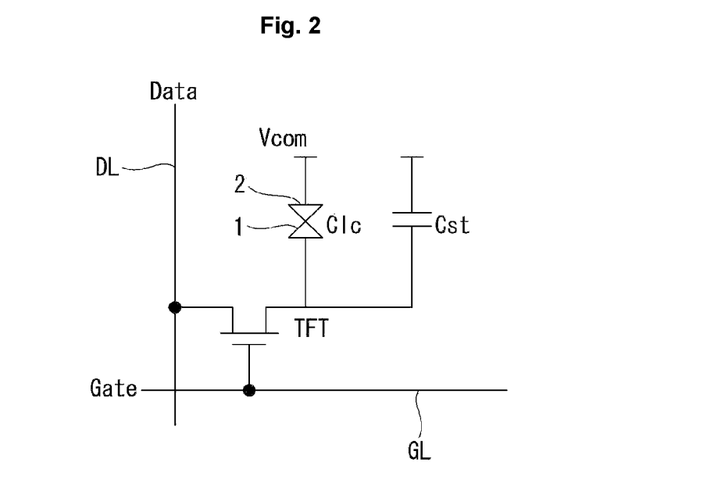
FIG. 2 is an equivalent circuit diagram of a liquid crystal cell.

The pixels of the display panel 10 are disposed in the form of a matrix defined by the data lines DL and the gate lines GL. A liquid crystal cell of each of the pixels is driven by an electric field applied according to a difference between a data voltage applied to the pixel electrode 1 and a common voltage applied to a common electrode 2 to adjust a transmission amount of incident light. The TFT is turned on in response to a gate pulse from the gate line GL to supply a voltage from the data line DL to the pixel electrode 1 of the liquid crystal cell. The common electrode 2 may be formed on the lower substrate or an upper substrate.

The upper substrate of the display panel 10 may include a black matrix, color filters, and the like. Polarizers are attached to the upper substrate and the lower substrate, and alignments layers are formed on inner surfaces of the substrates in contact with the liquid crystal to set a pre-tilt angle of the liquid crystal angle. A spacer maintaining a cell gap of the liquid crystal cell is formed between the upper substrate and the lower substrate of the display panel 10.

The display panel 10 may be implemented in any known liquid crystal mode such as a twisted nematic (TN) mode, a vertical alignment (VA) mode, an in-plane switching (IPS) mode, or a fringe field switching (FFS) mode. A backlight unit may be disposed on a rear surface of the display panel 10. The backlight unit may be implemented as an edge type or direct type backlight unit and irradiate light to the display panel 10.

The display panel driving circuit may write data of an input image to the pixels of the display panel 10 by using a data driving circuit 24 and gate driving circuits 26 and 30.

The data driving circuit 24 converts digital video data RGB into a positive polarity/negative polarity gamma compensation voltage to generate a data voltage. The data driving circuit 24 supplies the data voltage to the data lines DL and reverses polarity of the data voltage under the control of the timing controller 22.

The gate driving circuits 26 and 30 sequentially supply a gate pulse (or a scan pulse) synchronized with a data voltage to the gate lines GL to select a line of the display panel 10 to which a data voltage is written. The gate driving circuits 26 and 30 include a level shifter 26 and a shift register 30. The shift register 30 may be formed directly on the substrate of the display panel 10 in a gate-in-panel (GIP) manner.

The level shifter 26 may be formed on a printed circuit board (PCB) 20 electrically connected to the lower substrate of the display panel 10. The level shifter 26 outputs a start pulse (VST) and a clock signal CLK swung between a gate high voltage VGH and a gate low voltage VGL under the control of the timing controller 22. The gate high voltage VGH is set to a voltage equal to or higher than a threshold voltage of the TFTs formed in the pixel array of the display panel 10. The gate low voltage VGL is set to a voltage lower than the threshold voltage of the TFTs formed in the pixel array of the display panel 10. In response to a start pulse ST, a first clock GCLK, and a second clock MCLK input from the timing controller 22, the level shifter 26 outputs the start pulse VST and the clock signal CLK swung between the gate high voltage VGH and the gate low voltage VGL. The clock signals CLK output from the level shifter 26 are sequentially shifted in phase and transmitted to a shift register 30 formed in the display panel 10.

The shift register 30 is formed on the edge of the lower substrate of the display panel 10 in which the pixel array is formed, such that the shift register 30 is connected to the gate lines 12 of the pixel array. The shift register 30 includes a plurality of dependently connected stages. The shift register 30 starts to operate in response to the start pulse VST input from the level shifter 26, and shifts an output in response to the clock signals CLK to sequentially supply a gate pulse to the gate lines of the display panel 10.

The timing controller 22 supplies digital video data input from an external host system to integrated circuits (ICs) of the data driving circuit 24. Upon receiving a vertical synchronization signal Vsync, a horizontal synchronization signal Hsync, a data enable signal (Data Enable (DE)), a timing signal such as a clock, from the external host system, the timing controller 22 generates timing control signals for controlling an operation timing of the gate driving circuits 26 and 30. The timing controller 22 or the host system generate a synchronization signal SYNC for controlling an operation timing of the display panel driving circuit and the touch sensing circuit 100.

The touch sensing circuit 100 applies a touch driving signal to sensing lines L1 to L4 connected to capacitive touch sensors COMs of the touch screen to count a change in a touch driving signal voltage before or after a touch or a rising or falling edge delay time of the touch driving signal to sense a change in capacitance before or after the touch (or a proximity touch) is input. The touch sensing circuit 100 converts a voltage received from capacitive sensors of the touch screen into digital data to generate touch raw data, and analyze the touch raw data by executing a preset touch recognition algorithm to detect the touch (or a proximity touch) input. The touch sensing circuit 100 transmits touch report data including coordinates of the touch (or the proximity touch) input position to the host system.

The host system may be implemented as any one of a navigation system, a set-top box (STB), a DVD player, a Blu-ray player, a personal computer (PC), a home theater system, a broadcast receiver, and a phone system. The host system converts digital video signal of an input image into a format fitting to resolution of the display panel 10 by using a scaler, and transmits a timing signal together with the corresponding data to the timing controller 22. Also, in response to the touch report data input from the touch sensing circuit 100, the host system executes an application program associated with the touch (or the proximity touch) input.

Figure 3:
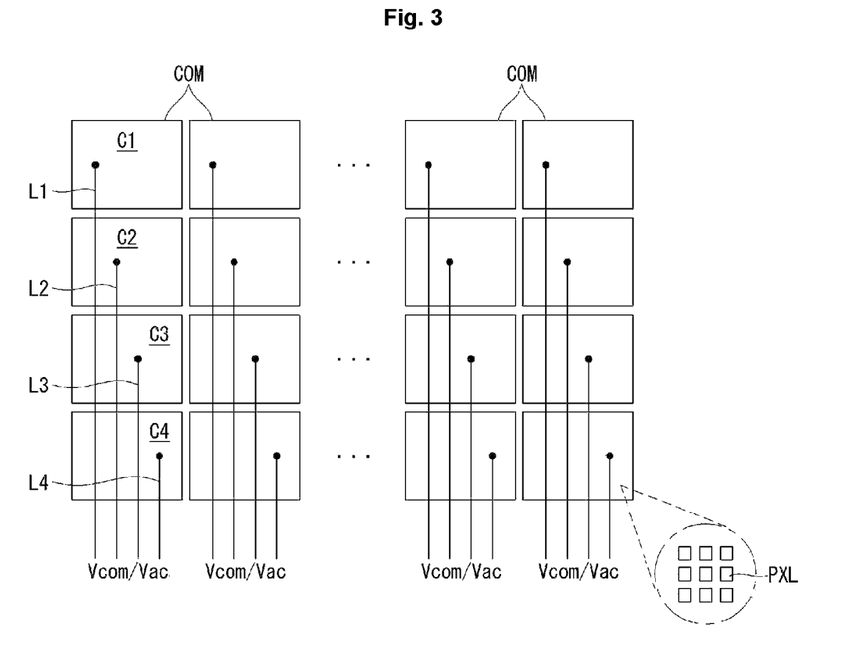
FIG. 3 is a plan view illustrating an interconnection structure of a touch screen according to an embodiment.
Figure 4:
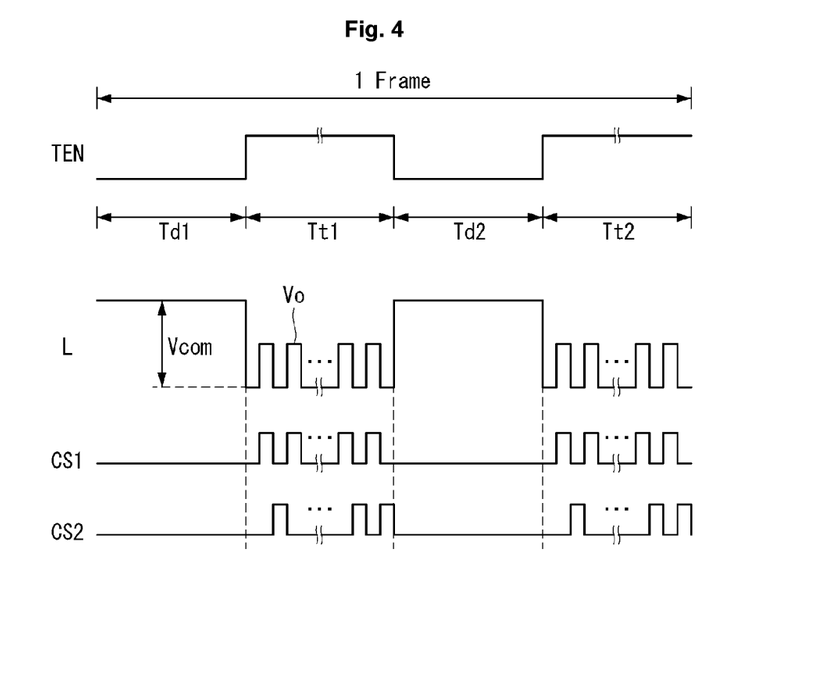
FIG. 4 is a waveform view illustrating touch driving signals for sensing touch in the touch screen of FIG. 3.

FIG. 3 is a plan view illustrating an interconnection structure of a self-capacitive touch screen (TSP). FIG. 4 is a waveform view illustrating touch driving signals for sensing the touch screen (TSP) of FIG. 3.

Referring to FIGS. 3 and 4, the self-capacitive touch screen (TSP) includes touch sensors COM. Each of the touch sensors (COM) is formed of a transparent conductive material larger than pixels. Each of the touch sensors (COM) overlaps a plurality of pixels. Each of the touch sensors (COM) is connected to self-capacitance so as to be used as an electrode of the self-capacitance during a touch screen driving period Tt1,Tt2.

The touch sensing circuit 100 may be connected to the touch sensors C1 to C4 through the sensing lines L1 to L4 in a one-to-one manner. A common voltage source (not shown) supplies a common voltage Vcom to the touch sensors COM through the sensing lines L1 to L4 during a display panel driving period Td1,Td2. Thus, the touch sensors COM operate as the common electrode 2 during the display panel driving period Td1,Td2.

The touch sensing circuit 100 is disabled during the display panel driving period Td1,Td2 and enabled during the touch screen driving period Tt1,Tt2 to simultaneously supply touch driving signals (Vac) illustrated in FIG. 4 to the sensing lines L1 to L4.

Figure 5:
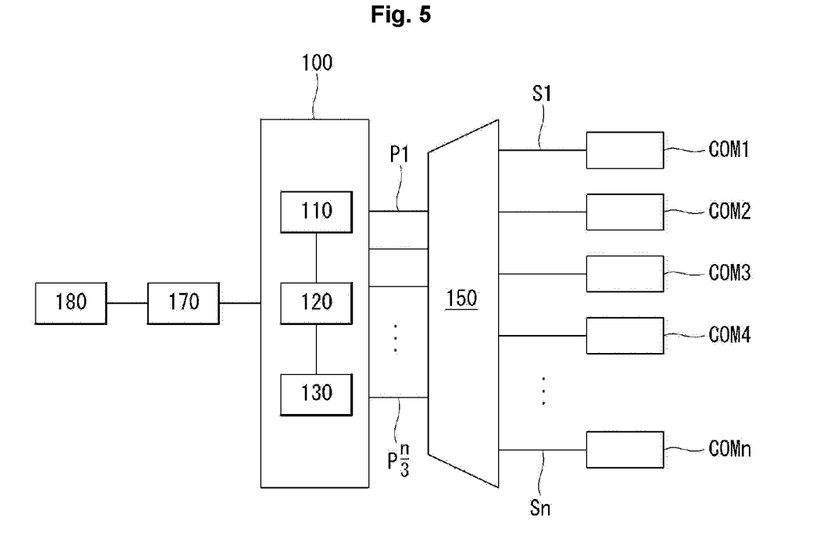
FIG. 5 is a block diagram illustrating a configuration of a touch sensing circuit, according to one or more embodiments.

FIG. 5 is a view illustrating connections between the touch sensing circuit 100 and the touch sensors COM. In the self-capacitive touch screen (TSP), in order to reduce the number of input/output pins of the touch sensor circuit 100, a multiplexer 150 may be installed between the touch sensing circuit 100 and the sensing lines L1 to L4 as illustrated in FIG. 5. When the multiplexer 150 is implemented as a 1:N (N is a positive integer equal to or greater than 2 and smaller than n) multiplexer, n/N number of input/output pins from which a touch driving signal is output in the touch sensing circuit 100 are connected to input terminals of the multiplexer 150. The n number of output terminals of the multiplexer 150 are connected to the sensing lines L1 to L4 in a one-to-one manner. Thus, in the present invention, the number of pins of the touch sensing circuit 100 may be reduced by 1/N by using the multiplexer 150.

When the sensing lines L1 to L4 are divided into three groups, the multiplexer 150 connects n/3 number of input/output pins P1 to Pn/3 to the sensing lines of the first group to simultaneously supply a touch driving signal to capacitive sensors connected to the sensing lines of the first group. Subsequently, the multiplexer 150 connects n/3 number of input/output pins P1 to Pn/3 to the sensing lines of the second group to simultaneously supply a touch driving signal to capacitive sensors connected to the sensing lines of the second group. Subsequently, the multiplexer 150 connects n/3 number of input/output pins P1 to Pn/3 to the sensing lines of the third group to simultaneously supply a touch driving signal to capacitive sensors connected to the sensing lines of the third group. Thus, the touch sensing circuit 100 may supply the touch driving signal to n number of transparent conductive block patterns COM1 to COMn through the n/3 number of pins by using the multiplexer 150.

The touch sensing circuit 100 includes a reception unit 110, a multi-integrator 120, and a sampling holder unit 130. The reception unit 110 receives a voltage of the touch driving signal changing according to capacitance of the touch sensors COM. The multi-integrator 120 accumulates the sensing voltage transferred from the reception unit 110 two or more times. Hereinafter, an embodiment will be described mainly with the multi-integrator 120 including a first integrator 121 and a second integrator 122 (illustrated in FIG. 8). The sampling holder unit 130 holds an output from the multi-integrator 120 and subsequently transfers the output to the ADC 170.

Upon receiving the output from the multi-integrator 120, the ADC converts the output into touch data, binary data, and transfers the touch data to an algorithm executing unit 180.

The algorithm executing unit 180 receives the touch data from the ADC 170 and calculates touch coordinates.

Figure 6:
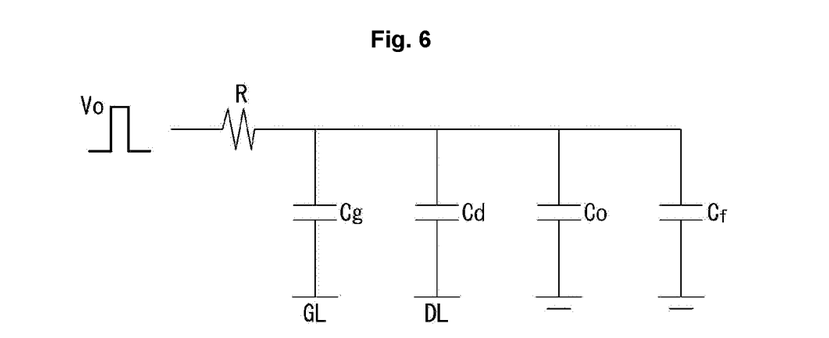
FIG. 6 is an equivalent circuit diagram of a touch screen according to an embodiment.
Figure 7:
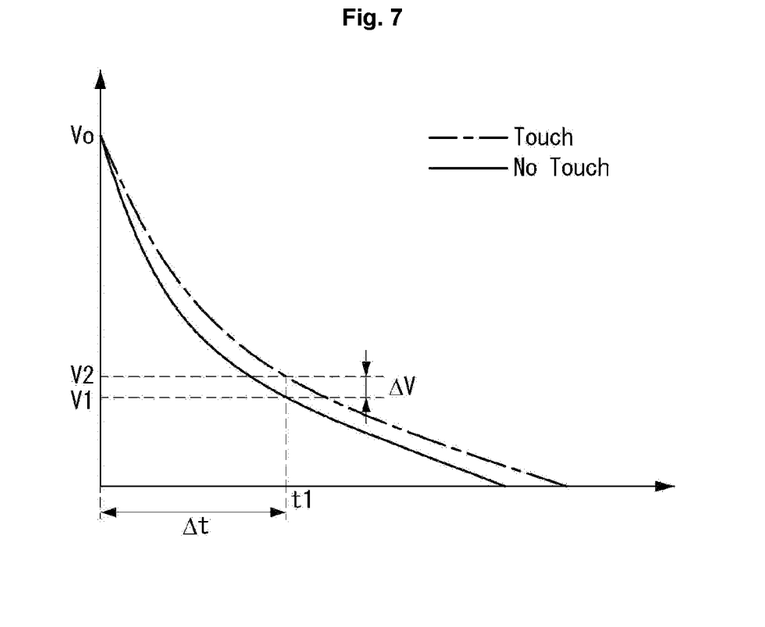
FIG. 7 is a graphical illustration of principles of calculating a sensing voltage by a reception unit.

FIG. 6 is an equivalent circuit diagram of a touch sensor according to an embodiment of the present invention, and FIG. 7 is a view illustrating a principle of calculating a sensing voltage by the reception unit.

Referring to FIGS. 6 and 7, the equivalent circuit of the touch sensor according to an embodiment of the present invention includes a resistor R and capacitors Cg, Cd, and Co. The resistor R includes lead resistance and parasitic resistance of the display panel 10 and the touch sensor COM. Cg denotes a capacitor between the sensing lines L1 to L4 and a gate line, and Cd is a capacitor between the sensing lines L1 to L4 and a data line. Co is a capacitor formed between components other than the data line DL and the gate line GL in the display panel 10, and the sensing lines L1 to L4.

When a touch driving signal Vo is applied to the sensing lines L1 to L4, a rising edge and a falling edge of the touch driving signal Vo are delayed by an RC delay value determined by the resistor R and the capacitors Cg, Cd, and Co. When a conductor or a finger comes into contact with the touch sensors COM, capacitance is increased by Cf (e.g., corresponding to a change in self-capacitance of a driven touch electrode due to a touch input) to increase the RC delay. For example, in FIG. 7, the solid line represents a falling edge of a touch driving signal when a touch input is not present, and the dotted line represents a falling edge of a touch driving signal when a touch input is present.

The reception unit 110 receives a falling edge voltage V2 of the touch driving signal for a unit time ($\Delta t$) and compares the received falling edge voltage of the touch driving signal with a reference voltage V1. The reference voltage V1 indicates a falling edge voltage of the touch driving signal for the unit time ($\Delta t$) when a touch input is not present. The reception unit 110 calculates a difference ($\Delta V$) between the reference voltage V1 and the falling edge voltage V2 of the touch driving signal, and outputs the calculated difference as a sensing voltage Vsen.

Figure 8:
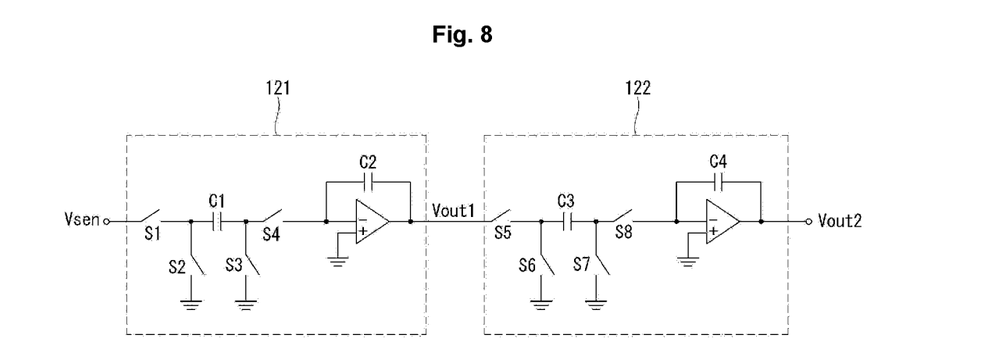
FIG. 8 is a circuit diagram illustrating a multi-integrator according to an embodiment.
Figure 9:
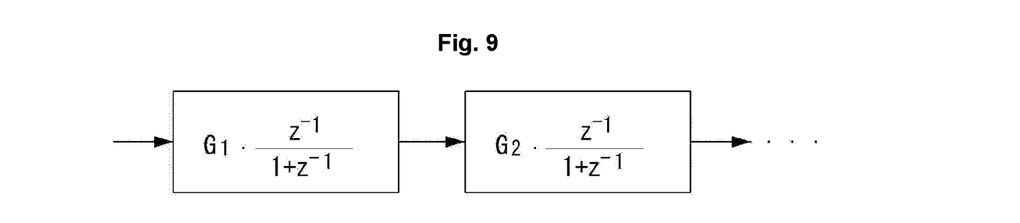
FIG. 9 illustrates an equivalent model of the multi-integrator of FIG. 8.

FIG. 8 is a view illustrating the multi-integrator 120, and FIG. 9 is a view illustrating modeling of the multi-integrator 120.

Referring to FIG. 8, the multi-integrator 120 includes a first integrator 121 and a second integrator 122. The first integrator 121 receives (e.g., samples via the first capacitor C1) the sensing voltage Vsen from the reception unit 110 and accumulates it (e.g., via the second capacitor C2) n times. The second integrator 122 receives (e.g., samples via the third capacitor C3) an output from the first integrator 121 and accumulates it (e.g., via the fourth capacitor C4) n times.

The first integrator 121 accumulates the sensing voltage Vsen through operations of first switch S1 to fourth switch S4. The first switch S1 and the third switch S3 are turned on by a first control signal CS1 during a first period to accumulate an electric charge corresponding to the sensing voltage Vsen to a first capacitor C1. The operation of the first integrator 121 by the first control signal CS1 is expressed by Equation 1 and a first transfer function (H[z]1) as follows.

$$H(z)1=-(C1/C2)(1/(1-Z^{-1}))$$ [Equation 1]

Here, −(C1/C2) is a gain value of the first transfer function, and Z denotes a Z domain determining stability of a system in discrete signal processing.

The second switch S2 and the fourth switch S4 are turned on by a second control signal CS2 during a second period and transfer the electric charges accumulated in the first capacitor C1 to the second capacitor C2.

As a result, the first integrator 121 accumulates the sensing voltage Vsen to a repetition number (n) of a switching signal including a pair of the first control signal and the second control signal and outputs a first integrated voltage Vout1.

The second integrator 122 accumulates the first integrated voltage Vout1 for a second time through operations of fifth switch S5 through eighth switch S8. The fifth switch S5 and the seventh switch S7 are turned on by the first control signal to accumulate an electric charge corresponding to the first integrated voltage Vout1 to a third capacitor C3. The operation of the second integrator 122 by the first control signal is expressed by Equation 2 and a second transfer function (H[z]2) as follows.

$$H(z)2=-(C3/C4)(1/(1-Z^{-1}))$$ [Equation 2]

Here, −(C3/C4) is a gain value of the third transfer function, and Z denotes a Z domain determining stability of a system in discrete signal processing.

The sixth switch S6 and the eighth switch S8 are turned on by the second control signal and transfer electric charges accumulated in the third capacitor C3 to the fourth capacitor C4.

As a result, the second integrator 122 accumulates the first integrated voltage Vout1 output from the first integrator 121 to a repetition number of a switching signal including a pair of the first control signal and the second control signal, and outputs a second integrated voltage Vout2.

The multi-integrator 120 may be modeled as illustrated in FIG. 9. That is, since the multi-integrator 120 accumulates the sensing voltage Vsen for the second time and outputs the same, the sensing voltage having a magnitude proportional to the square of the accumulation number (n) is output.

Figure 10:
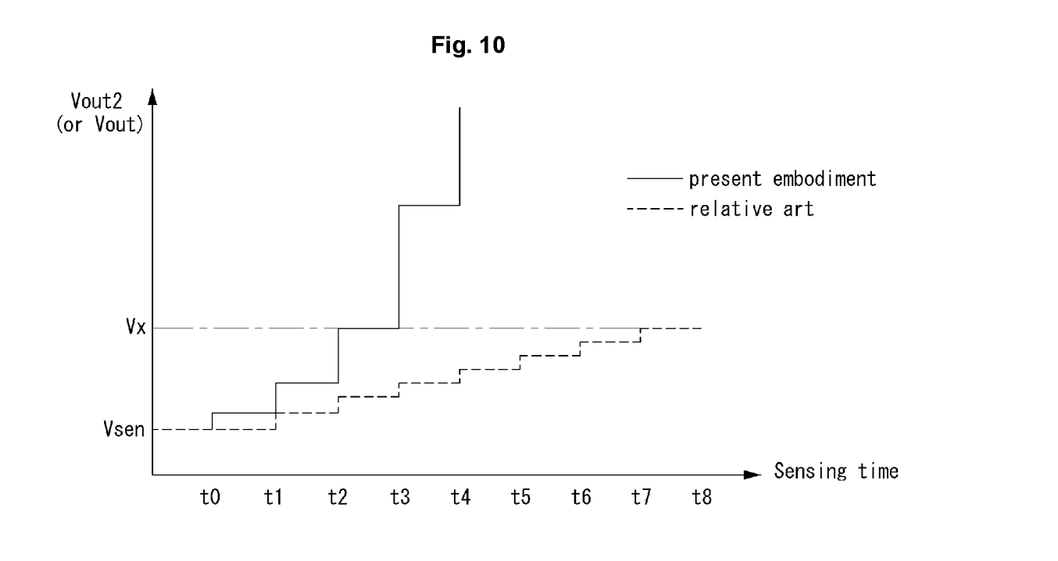
FIG. 10 illustrates calculation (e.g., detection) of the presence of touch input coordinates by an algorithm executing unit, according to one or more embodiments.

FIG. 10 is a view illustrating the second integrated voltage Vout2 output by the multi-integrator 120. In FIG. 10, the graph indicated by the dotted line represents an output (e.g., Vout1) of a single integrator according to a comparative example.

The algorithm executing unit 180 determines whether the second accumulated voltage of the multi-integrator 120 has reached a threshold voltage Vx, and when the second accumulated voltage Vout2 is equal to or higher than the threshold voltage Vx, the algorithm executing unit 180 determines that a touch event has occurred. Here, as illustrated in FIG. 10, since the multi-integrator 1200 determines a touch event on the basis of the second accumulated voltage Vout2, the multi-integrator 120 may determine the touch event within a short period of time, compared with a comparative example indicated by the dotted line. For example, as illustrated in FIG. 10, the voltage obtained by accumulating a certain sensing voltage by the multi-integrator 120 for a second time has reached the threshold voltage Vx within a period of time t3, while an output voltage Vout1 according to the comparative example has reached the threshold voltage Vx within a period of time t8.

As described above, the touch sensing apparatus according to an embodiment of the present invention may determine whether a touch event has occurred within a short period of time. Thus, in the present invention, even though a touch sensing period is short, a touch event may be accurately sensed.

A display panel driving period and a touch sensing period are driven in a time division manner within a first frame period. Thus, the touch sensing period may be reduced, and the display panel driving period and the touch sensing period may be driven two or more times in a time division multiplexed manner. That is, the touch sensing apparatus of the present invention may accurately sense a touch event even when a driving frequency increases so the touch sensing period is shortened. Thus, the touch sensing apparatus of the present embodiments may be advantageously applied to an LHB (Long Horizontal Blank) driving mode, and thus, a display panel may be driven at a high driving frequency.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensitive display device comprising:
a display panel comprising a plurality of display pixels defined at intersections of gate lines and data lines;
a plurality of electrodes; and
a touch sensing circuit configured to:
supply touch drive signals to the electrodes,
detect corresponding touch sense signals from the electrodes in response to the supplied touch drive signals, a touch sense signal indicating a change in self-capacitance of a driven electrode in response to a touch input on the driven electrode,
integrate, for a first predetermined duration of time, a measure of each of the touch sense signals, to generate a first integrated signal corresponding to each touch sense signal,
integrate, for a second predetermined duration of time, the first integrated signal, to generate a second integrated signal corresponding to each touch sense signal, and
determine presence of one or more touch inputs on one or more of the electrodes based on the second integrated signal.

2. The touch sensitive display device of claim 1, wherein each of the electrodes operates as a common electrode for one or more of the display pixels during display driving mode, and operates as a touch electrode during touch driving mode.

3. The touch sensitive display device of claim 1, wherein the first and second predetermined durations do not overlap.

4. The touch sensitive display device of claim 1, wherein the touch sensing circuit is configured to determine presence of touch inputs on the electrodes based on the second integrated signal by:
comparing the second integrated signal with a predefined threshold value, and determining a presence of a touch input on a respective electrode if the corresponding second integrated signal for the respective electrode exceeds the predefined threshold value.

5. The touch sensitive display device of claim 1, wherein the touch sensing circuit comprises an integrator circuit including a plurality of integrators connected in series, the plurality of integrators including:
a first integrator to sample and accumulate the measure of the touch sense signal, based on a first control signal and a second control signal, respectively, to generate the first integrated signal; and
a second integrator to sample and accumulate the first integrated signal, based on the first control signal and the second control signal, respectively, to generate the second integrated signal.

6. The touch sensitive display device of claim 5, wherein the touch sensing circuit is further configured to determine presence of touch inputs on the electrodes by:
comparing the second integrated signal with a predefined threshold value, and
determining a presence of a touch input on a respective electrode if the corresponding second integrated signal for the respective electrode exceeds the threshold value.

7. The touch sensitive display device of claim 5, wherein:
the first integrator comprises a first capacitor to sample the measure of the touch sense signal based on the first control signal and a second capacitor to accumulate the sampled measure of the touch sense signal for the first predetermined duration of time based on the second control signal, to generate the first integrated signal; and
the second integrator comprises a third capacitor to sample the first integrated signal based on the first control signal and a fourth capacitor to accumulate the sampled first integrated signal for the second predetermined duration of time based on the second control signal, to generate the second integrated signal.

8. The touch sensitive display device of claim 1, wherein the measure of the touch sense signal corresponds to a difference between a predefined reference value and a value of the touch sense signal measured at a predetermined time of the touch sense signal.

9. A method for detecting touch inputs in a touch sensitive display device, the touch sensitive display device including a plurality of electrodes, the method comprising:
supplying touch drive signals to the electrodes;
detecting corresponding touch sense signals from the electrodes in response to the supplied touch drive signals, a touch sense signal indicating a change in self-capacitance of a driven electrode in response to a touch input on the driven electrode;
integrating, for a first predetermined duration of time, a measure of each of the touch sense signals, to generate a first integrated signal corresponding to each touch sense signal;
integrating, for a second predetermined duration of time, the first integrated signal, to generate a second integrated signal corresponding to each touch sense signal; and
determining presence of one or more touch inputs on one or more of the electrodes based on the second integrated signal.

10. The method of claim 9, wherein the first and second predetermined durations of time do not overlap.

11. The method of claim 9, wherein determining presence of touch inputs on the touch electrodes based on the second integrated signal comprises:
comparing the second integrated signal with a predefined threshold value; and
determining a presence of a touch input on a respective electrode if the corresponding second integrated signal for the respective electrode exceeds the predefined threshold value.

12. The method of claim 9, further comprising:
sampling and accumulating, by a first integrator, the measure of the touch sense signal, based on a first control signal and a second control signal, respectively, to generate the first integrated signal; and
sampling and accumulating, by a second integrator connected in series with the first integrator, the first integrated signal, based on the first control signal and the second control signal, respectively, to generate the second integrated signal.

13. The method of claim 11, wherein determining presence of touch inputs on the electrodes comprises:
comparing the second integrated signal with a predefined threshold value, and
determining a presence of a touch input on a respective electrode if the corresponding second integrated signal for the respective electrode exceeds the threshold value.

14. The method of claim 12, further comprising:
sampling, by a first capacitor of the first integrator, the measure of the touch sense signal based on the first control signal;
accumulating, by a second capacitor of the first integrator, the sampled measure of the touch sense signal for the first predetermined duration of time based on the second control signal to generate the first integrated signal;
sampling, by a third capacitor of the second integrator, the first integrated signal based on the first control signal; and
accumulating, by a fourth capacitor of the second integrator, the sampled first integrated signal for the second predetermined duration of time based on the second control signal, to generate the second integrated signal.

15. The method of claim 9, wherein the measure of the touch sense signal corresponds to a difference between a predefined reference value and a value of the touch sense signal measured at a predetermined time of the touch sense signal.

16. A touch circuit comprising:
a touch driving circuitry configured to supply touch drive signals to electrodes of a touch panel; and
a touch sensing circuitry to:
detect corresponding touch sense signals from the electrodes in response to the supplied touch drive signals, a touch sense signal indicating a change in self-capacitance of a driven electrode in response to a touch input on the driven electrode,
integrate, for a first predetermined duration of time, a measure of each of the touch sense signals, to generate a first integrated signal corresponding to each touch sense signal,
integrate, for a second predetermined duration of time, the first integrated signal, to generate a second integrated signal corresponding to each touch sense signal, and
determine presence of one or more touch inputs on one or more of the electrodes based on the second integrated signal.

17. The touch circuit of claim 16, wherein the touch sensing circuitry comprises an integrator circuit including a plurality of integrators connected in series, the plurality of integrators including:
- a first integrator to sample and accumulate the measure of the touch sense signal, based on a first control signal and a second control signal, respectively, to generate the first integrated signal; and
- a second integrator to sample and accumulate the first integrated signal, based on the first control signal and the second control signal, respectively, to generate the second integrated signal.

18. The touch circuit of claim 17, wherein:
- the first integrator comprises a first capacitor to sample the measure of the touch sense signal based on the first control signal and a second capacitor to accumulate the sampled measure of the touch sense signal for the first predetermined duration of time based on the second control signal, to generate the first integrated signal; and
- the second integrator comprises a third capacitor to sample the first integrated signal based on the first control signal and a fourth capacitor to accumulate the sampled first integrated signal for the second predetermined duration of time based on the second control signal, to generate the second integrated signal.

* * * * *